(12) United States Patent
Omps

(10) Patent No.: US 8,375,895 B2
(45) Date of Patent: Feb. 19, 2013

(54) EASY TO CLEAN ANIMAL LITTER CONTAINER

(76) Inventor: Justin Thomas Omps, Arkington, VA (US)

( * ) Notice: Subject to any disclaimer, the term of this patent is extended or adjusted under 35 U.S.C. 154(b) by 0 days.

(21) Appl. No.: 13/385,227

(22) Filed: Feb. 9, 2012

(65) Prior Publication Data

US 2012/0210943 A1 Aug. 23, 2012

Related U.S. Application Data

(60) Provisional application No. 61/457,239, filed on Feb. 9, 2011.

(51) Int. Cl.
*A01K 1/01* (2006.01)

(52) U.S. Cl. ........................................ 119/166; 119/168

(58) Field of Classification Search .................. 119/166, 119/161, 163, 165, 168, 28.5
See application file for complete search history.

(56) References Cited

U.S. PATENT DOCUMENTS

| | | | |
|---|---|---|---|
| 4,505,226 A | 3/1985 | Carlson | |
| 5,517,947 A | 5/1996 | Christman | |
| 5,522,347 A * | 6/1996 | Merino | 119/165 |
| 5,601,052 A * | 2/1997 | Rood et al. | 119/166 |
| 5,752,465 A * | 5/1998 | Page | 119/166 |
| 6,463,881 B1 * | 10/2002 | Reitz | 119/163 |
| 7,128,022 B2 * | 10/2006 | Parr | 119/166 |
| 7,198,006 B2 * | 4/2007 | Fischer | 119/166 |
| 7,647,889 B2 * | 1/2010 | Horanoff | 119/163 |
| 7,712,437 B2 * | 5/2010 | Leung | 119/28.5 |
| 7,762,213 B2 | 7/2010 | Cook et al. | |
| 7,798,101 B2 * | 9/2010 | Waters | 119/166 |
| 7,849,818 B2 | 12/2010 | Matsuo et al. | |
| 7,856,945 B2 | 12/2010 | Matsuo et al. | |
| 8,127,715 B2 * | 3/2012 | Leung | 119/28.5 |

* cited by examiner

*Primary Examiner* — Yvonne Abbott
(74) *Attorney, Agent, or Firm* — Joan K. Lawrence, Esq.

(57) ABSTRACT

The present invention provides an animal litter container that is easy to clean and to maintain in a clean and sanitary condition. In one embodiment, the litter container includes at least two substantially identical container units correspondingly configured to nest together to form the litter container. Each container unit includes an inner bowl section that holds litter material and has a winged two part casing hinged to rotate between an open position in which the litter material is exposed and accessible to an animal desiring to use the litter container and a closed position forming a pod in which the litter is completely covered. A strainer plate or filter is provided to separate reusable litter from soiled litter for disposal. A second embodiment provides a base element and a correspondingly configured removable litter container element with a winged casing that is similar to that of the first embodiment.

18 Claims, 4 Drawing Sheets

EASY TO CLEAN ANIMAL LITTER CONTAINER

PRIORITY CLAIM

This application claims priority from U.S. Provisional Patent Application No. 61/457,239, filed Feb. 9, 2011.

FIELD OF THE INVENTION

The present invention relates generally to containers for the deposit by an animal of solid and liquid waste in a particulate litter material and specifically to an animal litter container configured to minimize contact with soiled litter material and animal waste while facilitating cleaning of the container.

BACKGROUND OF THE INVENTION

Many people who have pets, especially pet cats, choose, or may be required, to keep their pets inside at all times. An inside pet needs a place to deposit solid and liquid waste (feces and urine). This need has been met by the provision of a container known as a litter box. The basic requirements of a litter box are that it is configured to effectively hold the particulate material called litter, that it provides a place that is sufficiently attractive to the pet so that the pet deposits its waste in the litter, and that it can be cleaned to remove the deposited waste without excessive effort. While designers of animal litter boxes have focused on achieving these objectives, currently available litter box designs require more effort to keep clean them clean than is desirable from the pet owner's perspective. A clean litter box is not only important for keeping an animal healthy, it is also necessary for maintaining the litter box and its indoor location in an odor-free and sanitary condition.

There are currently available many types of containers of the sort typically referred to as litter boxes available from which pet owners can select to use for their indoor pets. While most of these containers are used by cats, they may be used by any indoor pet that can be trained to deposit its waste in a container. Such containers range from a very simple open top basin costing under $10 to elaborate arrangements that attempt to conceal or disguise the function of the structure costing in excess of $100. A simulated planter holding litter that can be accessed by the pet, complete with an artificial palm tree, is an example of one of these complex structures. Such a structure can be difficult to keep clean. The basin type of container, while inexpensive and easy to use from the pet's perspective, has drawbacks. Cats, in particular, dig in the litter material and cover their waste, which results in the litter material being spread outside the container unless the container walls are high enough to prevent this. Waste and soiled litter must be removed from the container by hand with a scoop, which is a tedious, dirty job. The simulated planter or other similarly enclosed types of litter containers, such as, for example, the dome covered litter container available under the BOODA brand and from other sources, prevent the spread of litter beyond the container, but present the same sorts of challenges to cleaning and maintaining the litter in a clean and sanitary condition. In U.S. Pat. Nos. 7,849,818 and 7,856,945, for example, Matsuo et al show and describe an animal litter box with a rotatably movable hood disposed above a removable evacuation container that allows the litter box to be used in an open or closed condition.

The prior art includes many litter container designs with features intended to facilitate cleaning. A simple solution for maintaining a clean litter container is to remove and dispose of all of the litter and clean the container before adding new litter every day. While this method very effectively keeps the container clean and sanitary, the appropriate disposal of used litter and the replacement cost of new litter must be considered. Most pet owners whose pets live indoors and use litter containers try to clean and reuse any reusable litter rather than discarding the litter each time the litter container is cleaned. The removal of only the soiled litter material and the reuse of the remaining litter material, which is made easier by the types of clumping litter material currently available, is the most widely used approach. A common approach manually removes solid waste and soiled litter with a slotted scoop implement. The soiled litter must be removed to another container or bag, which increases the likelihood of spills. With this approach, the litter container itself is typically not cleaned or sanitized very often. One type of litter container, such as that shown in U.S. Pat. No. 7,762,213 to Cook et al, for example, has a system that automatically removes waste after the animal has deposited it in the litter and includes sensors and a motorized rake/scoop element that is activated to remove the soiled litter. These systems tend to be noisy and can startle the animal before it has finished depositing its waste, which is likely to result in extra manual cleanup and a frightened animal that will not use the litter container.

Litter containers that provide a sifting feature to separate reusable litter from soiled litter so that the pet owner does not have to manually remove the litter are disclosed in the art. U.S. Pat. No. 5,517,947 to Christman, for example, describes a litter box with rectangular nested trays that include a sifting feature formed from a series of slots along one sidewall of each tray to allow reusable litter to pass from one tray to the other while the soiled litter is separated out for disposal. This litter container, while an improvement over other available litter containers, still can require quite a bit of manual effort by the pet owner to remove the soiled litter, especially the wet soiled litter. Carlson, in U.S. Pat. No. 4,505,226, describes an animal litter box that includes a pair of substantially identical nesting containers with grids at the bottoms sized to permit the passage of litter while retaining solid waste. A separate removable retaining edge attaches to the upper edge of these rectangular containers to keep litter in the box as the animal scratches in the litter material while depositing its waste. Each container also includes a separate false bottom piece with a peripheral rubber gasket that covers the apertures and provides a surface to which wetted litter can adhere. The false bottom piece must be mechanically worked to remove the wetted litter material. While this arrangement may be easier to clean than many available litter container designs, it also has some drawbacks. During cleaning, the retaining edge structure and then the false bottom piece must be removed before the litter can pass through the grid to the nested container below. Depending on how much litter is covering the false bottom piece, quite a bit of effort may be required to move the false bottom so the grid is exposed, especially if the rubber gasket becomes wet or otherwise sticks to the container. The spillage of soiled litter material outside the container as the false bottom is removed is a very real possibility. In addition, the vibrating and other mechanical working described to be required to remove the adhered wet soiled litter from the false bottom could well be beyond the physical capabilities of many pet owners.

The prior art, therefore, does not disclose an animal litter container for indoor use by an animal that is configured to minimize contact with soiled litter while facilitating cleaning of the container, making it truly easy for virtually all pet owners to clean the litter container and maintain it in a clean and sanitary condition without undue effort.

SUMMARY OF THE INVENTION

It is a primary object of the present invention, therefore, to overcome the disadvantages of the prior art and to provide an animal litter container for indoor use that is configured to minimize contact with soiled litter and animal waste while facilitating cleaning of the container so that it is easy for virtually any animal owner to clean and maintain in a sanitary condition.

It is another object of the present invention to provide an animal litter container with a design that facilitates the removal of soiled litter from the container and the reuse of unsoiled litter while minimizing contact with soiled litter.

It is a further object of the present invention to provide an animal litter container configured to cover the soiled litter during the litter container cleaning process.

It is yet another object of the present invention to provide an animal litter container with a configuration that minimizes spillage of the litter material from the container during cleaning.

It is yet an additional object of the present invention to provide a substantially portable, easily cleaned animal litter container that may be readily moved from its primary use location to a cleaning location without the risk of spilling soiled litter.

It is yet a further object of the present invention to provide an animal litter container of a size that is large enough for an animal to use comfortably without spreading litter material outside the container, yet is sufficiently compact that the container may be easily cleaned.

In accordance with the aforesaid objects, the present invention provides an animal litter container with a configuration that facilitates cleaning of the container by virtually any pet owner in any desired location while minimizing contact with the soiled litter and waste, allows the reuse of unsoiled litter, and prevents litter spillage. In one embodiment, the animal litter container of the present invention includes a pair of substantially identical upper and lower interchangeable nested bowl-shaped container elements, the upper one of which contains litter material. Each container element has a dual position, two part winged casing rotatable between a first open position in which the winged casing forms the container element exterior to provide a stable support base for the container on a flat surface and extends beyond the container opposite the base to form a flat planar surface and a second cleaning position in which a container element containing litter is covered. Each interchangeable container element includes a removable strainer plate mounted in a surface near the base that functions to strain reusable litter from the covered upper container element into the lower container element when the casing is closed. The strainer plate is designed to catch clumped waste inside the upper container element after the litter is strained into the lower container element. Each winged casing structure is rotatably locked on supporting axles on a container element and includes in a wing portion integral handles that facilitate rotation of the wing casing between the first open position and the second closed position to cover the upper container element and allow it to be lifted to strain the reusable litter into a lower container. The closed container element can then removed to a separate cleaning location, if desired, where the removable strainer plate is removed so the clumped soiled litter and solid waste can be disposed of. The upper container element and strainer plate can be easily washed and sanitized and the litter container reassembled by rotating the winged casing to the open position and inserting the litter-containing formerly lower container element into the clean formerly upper container element. In a second embodiment of the present invention, the lower container is replaced by a base element that is configured to receive and support a bowl-shaped container element holding litter material that is similar to the container elements of the first embodiment. The bowl-shaped container element of the second embodiment has a dual position, two part winged casing rotatable between an open position in which the litter container is accessible to an animal and a closed position in which the soiled litter material can be separated from reusable litter material for disposal.

Other objects and advantages of the easy to clean litter container of the present invention will become apparent from the following description, drawings, and claims.

DETAILED DESCRIPTION OF THE INVENTION

The plethora of different animal litter containers and varieties of litter materials described in the patent art and available in the marketplace that claim to minimize the inconvenience of having an indoor animal waste disposal container and to make the chore of cleaning this container easier is almost overwhelming. While currently available litter materials have achieved some success in masking odors and causing animal wastes to clump so that the removal of waste and only the soiled litter is easier, the waste and soiled litter must still be removed and the litter container must still be cleaned to maintain a sanitary and healthy environment, both for the pet animal and for the pet owner. Many litter containers are easier to clean now than in the past, but there remains considerable effort involved to keep these containers and their surroundings as clean and sanitary as they should be. The present invention provides an animal litter container that minimizes contact with soiled litter and solid waste and is exceptionally easy to clean and to maintain in a clean and sanitary condition.

Figures 1A, 1B, 2, 3A:
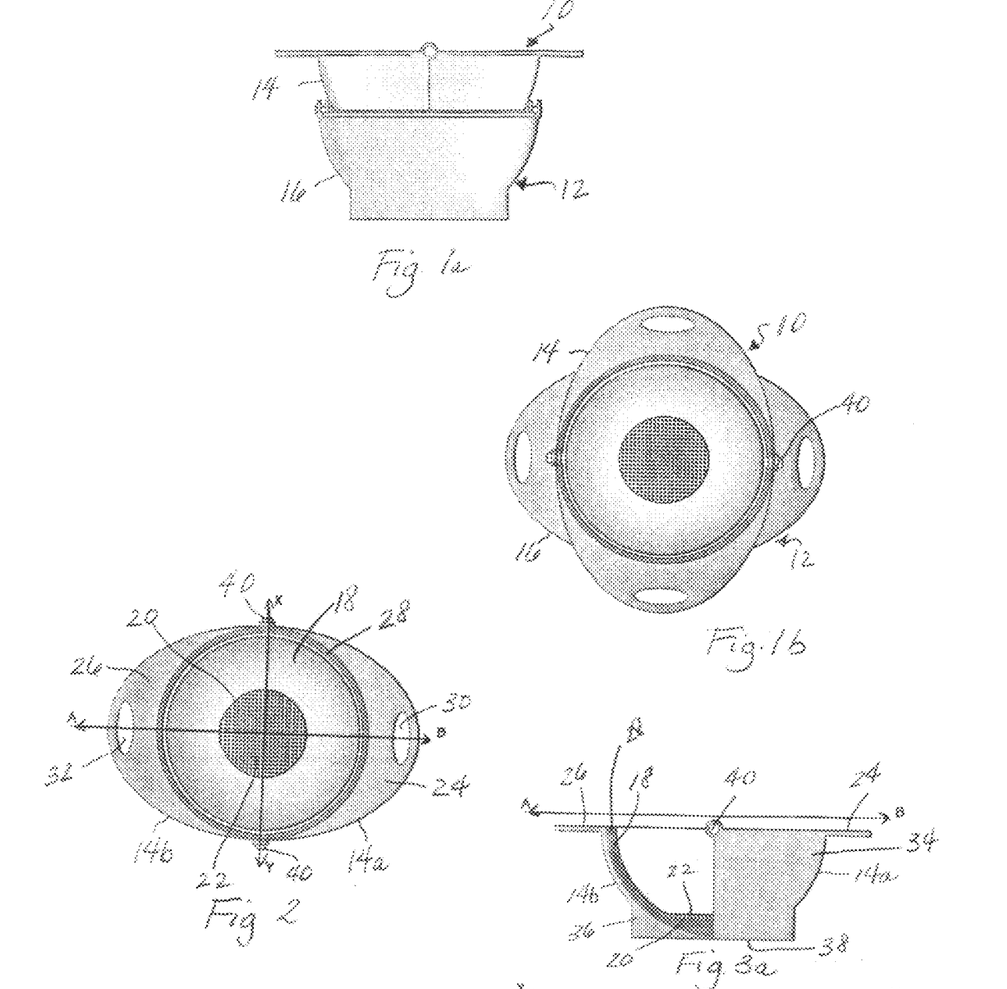
FIG. 1a is a side view of the animal litter container of a first embodiment of the present invention showing the nesting arrangement of two container elements.
FIG. 1b is a top view of the animal litter container of a first embodiment of the present invention showing the nesting arrangement of two container elements.
FIG. 2 is a top view of one configuration of a container element of the animal litter container of the present invention.
FIG. 3a is a partially cut away cross section of the container element of FIG. 2 taken along lines A-B of FIG. 2.

Referring to the drawings, FIG. 1a shows a side view of the main components a first embodiment of the present animal litter container. Two substantially identical pail-shaped container elements 10 and 12 with exterior winged casings 14, 16, in an open position as described below, are shown partially nested together. The components of the container elements 10 and 12 are also discussed in detail below. FIG. 1b shows nested structures 10 and 12 in top view. As can be seen in FIG. 1b, the nested components resemble a fractal in appearance.

FIG. 2 illustrates a single container element 10 in top view. Container element 10 includes a bowl 18 structure that is preferably substantially semispherical in configuration with a flattened bottom portion 20 that includes mounted therein a strainer plate 22. The winged casing 10, shown in a fully opened position, includes planar wing sections 24, 26 that extend beyond the circumference of the bowl 18 and are substantially coplanar with the top edge 28 of the bowl. It is to be noted that the planar wing sections 24, 26 form the shape of an ellipse in this position when viewed from above. Openings 30, 32 are positioned at opposite ends of the planar wing sections 24, 26, preferably toward the outer circumference of the ellipse as shown in FIG. 2. The elliptical configuration of the openings 30, 32 is preferred, but other configurations could be used as well. The openings 30, 32 form convenient handles for moving the winged casing sections.

Figure 3B:
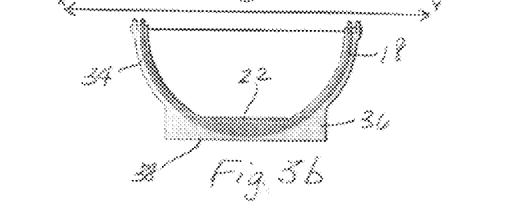
FIG. 3b is a cross section of the container element of FIG. 2 taken along lines X-Y of FIG. 2.

FIGS. 3a and 3b present two cross sectional side views of the container structure 10 and bowl 18, and the planar wing sections. FIG. 3a shows a view of taken along line A-B of FIG. 2, and FIG. 3b shows a view taken along line X-Y. FIG. 3a shows the planar nature of the wing sections 24, 26 relative to the bowl top edge 28. The flattened bottom portion 20 of the bowl 18 and the strainer plate 22 are also shown. An upper section 34 of the exterior winged casing 14 has a diameter slightly larger than that of the bowl 18 and a rounded configuration like that of the bowl 18, while a lower section 36 of the exterior winged casing 14 is cylindrical and has a flat lower surface 38. The flat lower surface 38 contacts the floor or other surface on which this embodiment of the present animal litter container is to be placed and keeps the container stable. Only one container element 10 is shown in FIGS. 3a and 3b, and only one part of a winged casing section 14a is shown in FIG. 3a. It will be noted that the winged casing 14 forms an exterior shell covering the exterior surface of the bowl 18 when the winged casing is in the first open position shown in FIGS. 3a and 3b.

Figure 4:
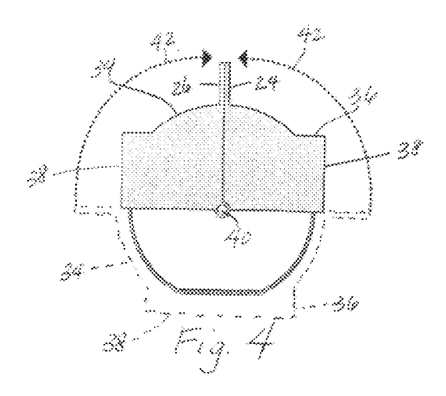
FIG. 4 is a side cross sectional view of one configuration of a container element of the animal litter container of the present invention showing the winged casing in a closed filtering and cleaning position.

FIG. 4 illustrates, in side view, this embodiment of the animal litter container of the present invention with the winged casing sections 14a, 14b in the second, closed position that these components will assume when it is desired to clean the litter and litter container. The winged casing sections are rotatably mounted on the bowl 18, preferably on an axle 40, so that the planar wing sections 24 and 26 can be brought together by rotating them in the direction of the arrows 42 from the open position, planar orientation shown in FIG. 3a to the closed position shown in FIG. 4. Other rotatable mounting structures are also contemplated to be within the scope of the present invention. The two openings 30, 32 in the planar wing sections will meet to form a single handle when the planar wings 24, 26 are in the FIG. 4 position. The handle enables the upper container element 10 to be lifted easily up and away from the lower container element 12 to filter, sift, or strain the litter from container element 10 into container element 12 as will be explained below in connection with FIGS. 8a to 8d.

Figure 5A:
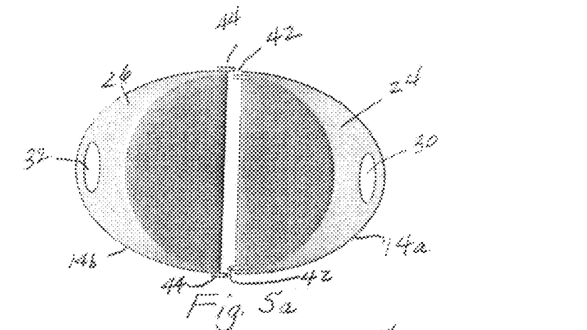
FIG. 5a is a top view of the winged casing components of one configuration of a container element of the animal litter container of the present invention.
Figure 5B:
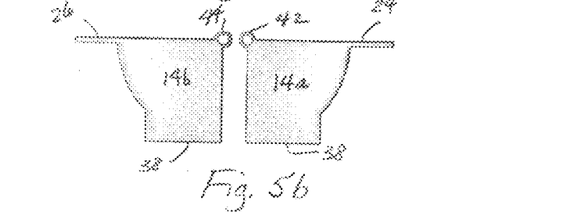
FIG. 5b is a side view of the winged casing components of one configuration of a container element of the animal litter container of the present invention.

The details of preferred components of the first embodiment of each container element 10, 12 are shown and discussed in connection with FIGS. 5a and 5b, 6a and 6b, and 7a and 7b. FIGS. 5a and 5b show the winged casing sections 14a and 14b of container element 10 in top and side view, respectively. Each winged casing section 14a, 14b is rotatably mounted on the bowl 18 and is movable between a first open position in which the casing covers the exterior of the sides and bottom of the bowl 18 to from a flat surface 38 that supports the entire container element on a flat surface and the planar wing sections 24, 26 form a flat ledge planar with the upper edge of the bowl. When the winged casing is in this position, the litter container is easily accessed by an indoor pet and provides a place for the pet to deposit its waste. When it is time to clean the litter, the planar wing sections 24 and 26 are rotated so that they contact each other in the vertical orientation in the second, closed position shown in FIG. 4. The remainder of the winged casing also rotates about the axle 40, covering the bowl 18 (FIG. 4). As shown in FIGS. 5a and 5b, the winged casing includes identical mirror image sections 14a and 14b. Interlocking hinges 42 and 44 are positioned on each section to engage a corresponding axle 40 on the bowl 18. As shown in FIG. 5a, the hinges 42 are offset slightly from hinges 40 to provide a secure connection as the winged casing sections are rotated between positions. The hinges 42, 44 allow the winged casing sections to rotate around the center line of the bowl.

Figure 6A:
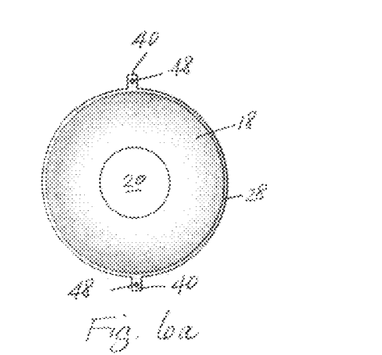
FIG. 6a is a top view of one configuration of a bowl structure preferred for use as a component of the container element of the animal litter container of the present invention.
Figure 6B:
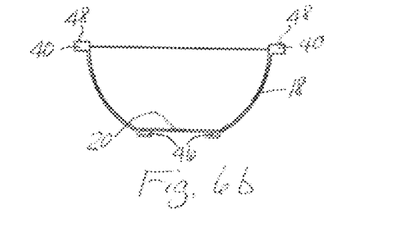
FIG. 6b is a side view of one configuration of a bowl structure preferred for use as a component of the container element of the animal litter container of the present invention.

FIGS. 6a and 6b illustrate a preferred configuration of the bowl portion of a container element of the animal litter container of the present invention. The bowl 18 actually holds the litter material and is the part of the present litter container that is most likely to require cleaning. As indicated above, the bowl 18 has a substantially semispherical shape with a flattened bottom area 20 that is designed to hold a removable strainer plate 22. FIG. 6b shows one configuration of a holder 46 for a strainer plate. Other mounting configurations that allow easy removal of the strainer plate 22 are also contemplated to be within the scope of the present invention. The upper edge 28 of the bowl includes opposed axles 40 that are preferably formed integrally with the bowl, but may also be attached separately. The axles should be positioned along the center axis of the bowl to insure that the winged casing sections 14a, 14b will rotate accurately, first to form an exterior shell and support base for the bowl 18 and then to form a closed cover for the bowl 18. Axle lock detents 48 area are provided to facilitate the attachment and removal of the winged casing sections 14a and 14b.

Figure 7A:
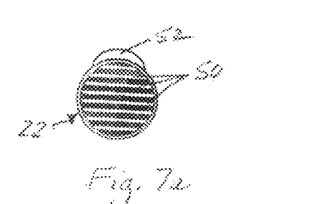
FIGS. 7a and 7b show in top view and side cross sectional view, respectively, one configuration of a strainer plate usable with the bowl structure of FIGS. 6a and 6b.
Figure 7B:
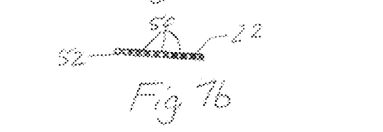

FIGS. 7a and 7b show a preferred strainer plate 22 design in top and side view, respectively. Openings in the form of parallel slots 50 are shown extending across the strainer plate 22, and a pull-out tab 52 is provided to make the plate easy to grasp and remove or replace in the strainer plate holder 46. Slots are only one of a number of possible configurations of openings or apertures that strainer plate 22 could be formed with. Other types of openings, for example a grid with square openings or a plate with circular openings, could also be used. The openings must be large enough to let particles of unsoiled litter pass through the strainer plate but small enough to keep clumps of soiled litter in the bowl 18.

Figure 8A:
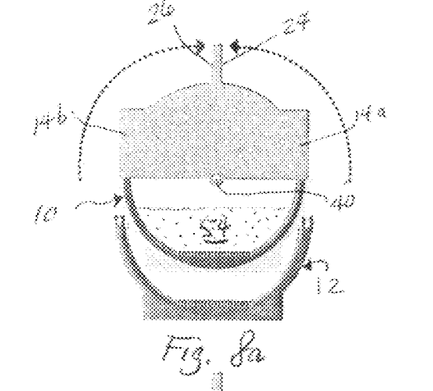
FIGS. 8a, 8b, 8c, and 8d illustrate the relative positions of the container element components of a first embodiment of the animal litter container of the present invention during the process of cleaning the container.
Figure 8B:
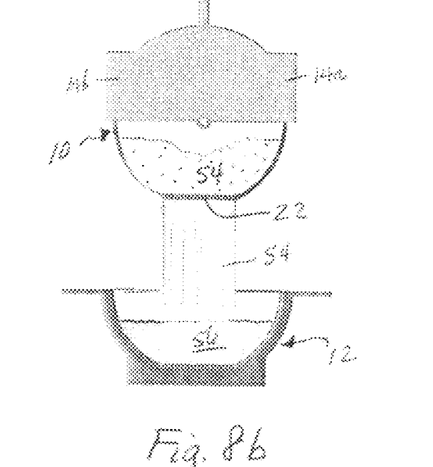
Figure 8C:
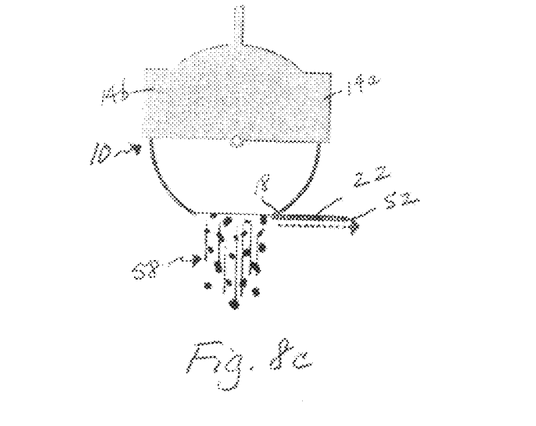

FIGS. 8a, 8b, 8c, and 8d show the way the components of the present animal litter container work cooperatively to facilitate the cleaning of the litter container. FIG. 8a illustrates the first step, in which the axle lock detent (not shown) is deactuated to release the planar wing sections. The handles formed by the winged casing sections 14a and 14b with the openings 30, 32 are grasped and pulled together to the upright vertical position shown, exposing the strainer plate at the bottom of the bowl 18. The upper nesting container 10 is lifted using the handles. Litter 54 flows through the strainer plate 22 mounted in the bottom of the bowl of the container element 10, and strained, reusable litter 56 collects inside the bowl of the container element 12, as shown in FIG. 8b. When straining is complete, only clumping solids and solid waste remain inside the container element 10. The light weight of the container element 10, which can be easily carried by the handle, allows disposal of the clumping solids and solid waste near the litter container location or at a location remote from the litter container that may be a better disposal location. FIG. 8c illustrates the disposal of clumping litter and solid waste 58. This is done simply by pulling on the pull-out tab 52 to remove the strainer plate 22 from the bottom of the bowl. The strainer plate 22 is then replaced. The winged casing sections 14a, 14b in the closed position keep the bowl 18 covered during the entire time litter is being sifted or strained and clumped litter and solid waste are being disposed of. At this point, the container element 10 can be cleaned further and sanitized if required or desired.

Figure 8D:
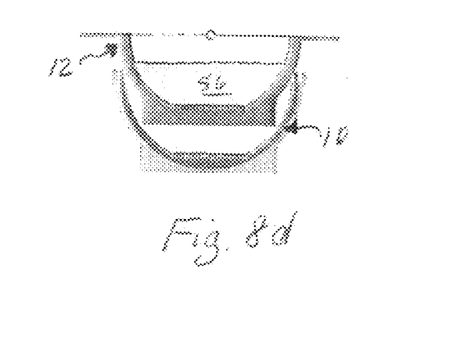

The final step is to put the containers elements 10 and 12 back together, as shown in FIG. 8d. The winged casing sections 14a and 14b in the just cleaned and now empty container element 10 are lowered from the closed cover position to the open position and the axle lock detents are actuated to lock the wing sections in place. The formerly lower container element 12, which now contains reusable litter 56, becomes the upper container element and is lowered into the formerly upper, now empty, container element 10. The nested unit is again ready for use. When it is again time to clean the litter container, the steps shown in FIGS. 8a-8d should be repeated. Because the cleaning process is simple and minimizes exposure to animal waste products and soiled litter, many pet owners whose pets use the animal litter container of the present invention are very likely to be motivated to clean the litter container more frequently than they do presently.

Figure 9:
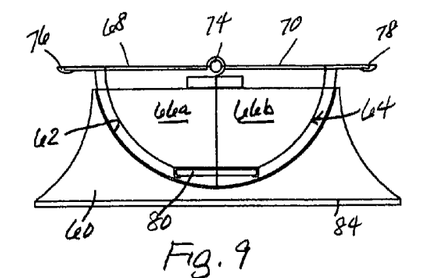
FIG. 9 is a side view of a second embodiment of the animal litter container of the present invention in an open position.
Figure 10:
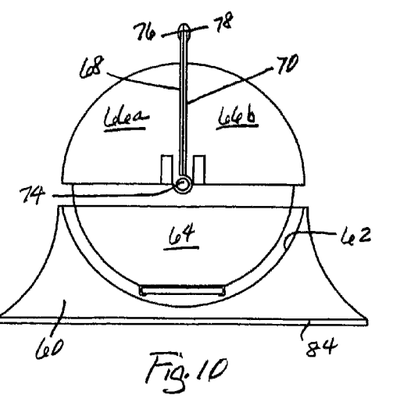
FIG. 10 is a side view of the second embodiment of the animal litter container of the present invention with the container wing portions in a closed position.
Figure 11:
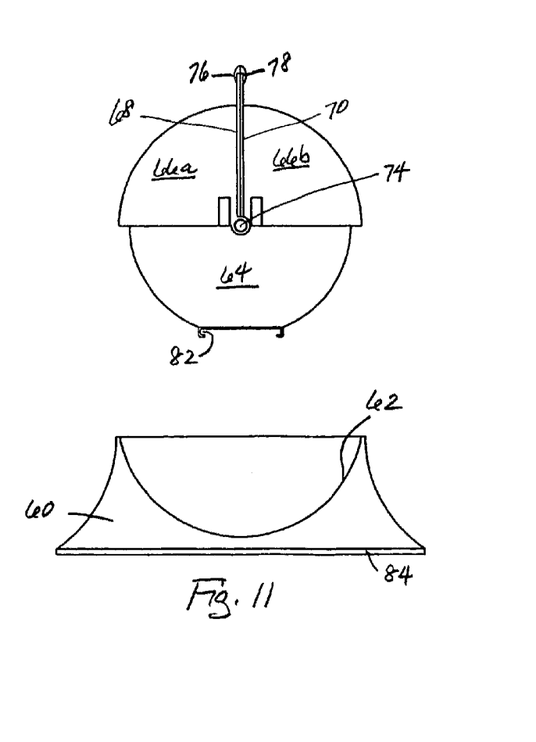
FIG. 11 is a side view of the second embodiment of the animal litter container of the present invention showing the base and container elements in a cleaning and filtering position.

A second embodiment of the easy to clean animal litter container of the present invention is shown in FIGS. 9, 10, and 11. In this embodiment, one of the identical nested container elements is replaced by a base element 60. While the flared shape of the base element 60 in FIGS. 9-11 is preferred, other configurations that provide similar stability could also be used to form the base element. The base element 60 includes a substantially semispherical receptacle 62 that is sized to receive and hold a bowl-shaped container element 64 that is substantially the same as the bowl portion of the container element of the first embodiment of the present invention shown in FIGS. 6a and 6b. Wing assembly elements 66a and 66b, which are substantially similar to winged casing sections 14a and 14b of the first embodiment, are shown in an open position in FIG. 9 and in a closed position in FIGS. 10 and 11. Planar wing sections 68 and 70, like planar wing sections 24 and 26 of the first embodiment shown in FIGS. 2-5, are coextensive with the top surface of the bowl 64. The planar wing sections 69 and 70 are rotatably connected by a hinge 74 so that they are movable between the open position shown in FIG. 9 and the closed position shown in FIGS. 10 and 11. The ends 76 and 78 of the respective planar wing sections 68 and 70 meet to form a handle. As in the first embodiment, openings (not shown) are preferably provided in each planar wing section 68, 70 to facilitate moving and carrying the container element. The bowl 64 is designed to receive a removable filter or strainer plate 80, which is similar in configuration to the strainer plate 22 in the first embodiment. The strainer plate 80 is preferably removably mounted in a receptacle 82 (FIG. 11) in the bottom of the bowl where it can be easily removed and reinserted. Other mounting arrangements could also be used and are contemplated to be within the scope of the present invention. The base 60 preferably includes a base plate 84 formed of a material that prevents the base from slipping on a smooth, hard floor surface and/or provides additional stability on a carpeted or like surface.

The operation of the second embodiment of the present easy to clean animal litter container is shown sequentially in FIGS. 9 to 11. In the position shown in FIG. 9, the bowl 64 and wing sections 66a and 66b sit inside the receptacle 62 in the base 60. Both wing sections are securely locked in this position by a locking mechanism (not shown) associated with the hinge 74 as described above in connection with the first embodiment. The bowl 64 can be filled with litter material, and the container is easily accessed by an animal. When the litter material requires cleaning, the axle lock mechanism is deactuated or released so that the wing sections 66a and 66b can be rotated away from the base to the closed position illustrated in FIG. 10. When the wing sections are completely rotated so that the planar sections 68 and 70 meet, the wing sections form a pod with the now exposed bowl 64 and strainer plate 80. The soiled litter material is covered by the pod. FIG. 11 shows the bowl 64 lifter completely away from the base 60 for cleaning. The entire pod is lifted by the handle formed by wing section ends 76 and 78. Once the pod is clear of the base 60, the clean, reusable litter will fall through the filter or strainer plate 80 due to gravity and will be collected in the receptacle 62 of the base 60. The clumped soiled litter is trapped in filter or by the strainer plate as in the first embodiment. Soiled litter can be disposed of by removing the filter or strainer plate 80 over a suitable waste disposal receptacle. If needed, the bowl 64 can be cleaned after the soiled litter has been removed. The container is reset to the open position of FIG. 9 by rotating the wing sections 66a, 66b toward the base 60 so that the locking mechanism is automatically engaged. The cleaned reusable litter material is then poured from the base receptacle 62 into the bowl 64, the bowl is set into the base receptacle, and the container is in the FIG. 9 position and ready for use.

Both of the embodiments of the animal litter container of the present invention are easily accessed for use by an animal and then easily cleaned. The soiled litter can be effectively separated from litter that can be reused, if desired, in both designs. The second embodiment presents some advantages over the first and may be preferred for this reason. The base element 60 of the second embodiment has a configuration that is less expensive to manufacture than one of the nested bowl-shaped containers with the winged sections of the first embodiment. The configuration of the base element 60 can also be made wider than the winged bowl-shaped container, which provides a lower center of gravity for the entire assembly and enhances stability.

The animal litter container of the present invention could be formed from a variety of materials, but will preferably be formed from a plastic with sufficient rigidity for this purpose that can be injection molded or processed in a similar manner to form the components described herein. Suitable plastics include, but are not limited to, polystyrene, nylon, polyethylene, polyethylene terephthalate, and the like, both alone and/or in suitable combinations.

While the shape of the animal litter container shown in the drawings and described herein is not intended to be limiting, the geometry of the combined bowl and winged casing is critical, and the dimensions must be precisely calculated for the winged casing sections to rotate about a central axis and function as both an outer shell and stable base over the lower portion of the container in the first embodiment and a cover with a handle over the upper portion of the container element in both embodiments described herein. The dimensions used for the animal litter container of the present invention must also provide a sufficiently large container to accommodate a range of different indoor pets.

The present animal litter container has been described and shown with two nested container components. The use of more than two nested containers is contemplated to be within the scope of the present invention, however. Although the use of two nested containers as shown in the drawings is likely to be ideal for cats, a stack of several nested containers may be suitable for some animal applications.

While the present invention has been described with respect to preferred embodiments, this is not intended to be limiting, and other arrangements and structures that perform the required functions are contemplated to be within the scope of the present invention.

Industrial Applicability

The present invention provides an animal litter container that is convenient for pets kept indoors to use and easy for pet owners to clean and maintain in a clean and sanitary condition. It is contemplated that the present animal litter container will be used primarily by cats, but owners of other kinds of indoor pets will also find the easy to clean features and the minimal contact with soiled litter and animal waste of the present animal litter container to be an attractive alternative to currently available litter containers that are not easy to clean.

The invention claimed is:

1. An animal litter container configured to hold a supply of a litter material, to provide an attractive location where an indoor pet animal can deposit waste, and to be easily cleaned and sanitized, comprising base means configured to support and removably receive in nesting contact a correspondingly configured bowl means holding a supply of a litter material, wherein said bowl means comprises winged casing means rotatably mounted on said bowl means to move between an open position, wherein said winged casing means is configured to cover an exterior surface of said bowl means to expose said supply of litter material, and a closed position, wherein said winged casing means configuration forms a cover means to cover said bowl means and enclose said supply of litter, and strainer means for separating soiled litter from said supply of litter material.

2. The animal litter container of claim 1, wherein said winged casing means comprises a pair of wing elements lockingly and rotatably mounted on said bowl means to rotate and lock in said open position when the litter container is ready for use by an animal and to unlock and rotate to said closed position when the litter material requires cleaning.

3. The animal litter container of claim 2, wherein each said wing element comprises a planar section contiguous with and extending beyond an upper surface of said bowl means, said planar sections forming handle means for lifting said bowl means when said wing elements are in said closed position.

4. The animal litter container of claim 1, wherein said base means and said bowl means are identical and said base means comprises winged casing means rotatably mounted on said base means to move between an open position, wherein said winged casing means covers an exterior surface of said base means to expose said supply of litter material and a closed position wherein said winged casing means configuration forms a cover means to cover said base means and enclose said supply of litter, and strainer means for separating soiled litter from said supply of litter material.

5. The animal litter container of claim 4, wherein said base means is formed integrally with said winged casing means.

6. The animal litter container of claim 1, wherein said base means comprises receptacle means correspondingly configured to an exterior shape of said bowl means to removably support said bowl means when said wing elements are locked in said open position.

7. The animal litter container of claim 6, wherein said cover means is formed by said wing casing means in said closed position.

8. The animal litter container of claim 1, wherein said base means is sized to receive substantially all of said supply of litter.

9. The animal litter container of claim 1, wherein said bowl means includes axle means for rotatably receiving hinge means on said winged casing means and locking mechanism means actuatable and releasable to move said winged casing means between said open and closed positions and to hold said winged casing sections in a selected position.

10. The animal litter container described in claim 1, wherein said strainer means comprises an apertured plate removably mounted in a bottom portion of said bowl means.

11. The animal litter container described in claim 10, wherein the apertures in said plate have a configuration selected from the group comprising rectangular slots, square apertures, and circular apertures.

12. A method for cleaning the animal litter container described in claim 1, comprising the steps of:
   a. rotating the winged casing means of said bowl means from said open position to said closed position to cover said supply of litter;
   b. lifting said bowl means out of nesting engagement with said base means to cause all of the flowable litter material to flow through the strainer means from the bowl means to the base means, trapping soiled litter and solid waste in said bowl means;
   c. removing the strainer means to release and dispose of soiled litter and solid waste;
   d. replacing the strainer means and rotating the winged casing means of the bowl means from the closed position back to the open position; and
   e. replacing the empty, clean bowl means in the base means.

13. A method for cleaning an animal litter container having the configuration described in claim 4, including the steps of:
   a. rotating the winged casing means of said bowl means from said open position to said closed position to cover said supply of litter;
   b. lifting said bowl means out of nesting engagement with said base means to cause flowable litter material to flow through the strainer means from the bowl means to the base means, trapping soiled litter and solid waste in said bowl means;
   c. removing the strainer means to release and dispose of soiled litter and solid waste;

d. replacing the strainer means and rotating the winged casing means of the empty, clean bowl means from the closed position back to the open position; and e. positioning the empty, clean bowl means below the litter containing base means so that the base means becomes the bowl means.

14. An animal litter container configured to hold a supply of a litter material, to provide an attractive location where an indoor pet animal can deposit waste, and to be easily cleaned and sanitized, wherein said animal litter container comprises:

a. at least two substantially identically configured container means for holding a selected quantity of a litter material, wherein each one of said container means is in removable nesting engagement inside and above another one of said container means and includes a substantially semispherical bowl means for holding said selected quantity of litter material;

b. winged casing means rotatably hinged to said semispherical bowl means to move between a first open position wherein said winged casing means forms an exterior support for said semispherical bowl means and said litter material is accessible to a pet animal and a second closed position wherein said winged casing means forms a cover over said semispherical bowl means and said litter material is covered; and c. strainer means positioned in said semispherical bowl means for separating soiled litter and animal waste from said quantity of litter.

15. The animal litter container described in claim 14, wherein said winged casing means is configured to provide base means for supporting said semispherical bowl means on a flat surface and planar wing means forming a planar surface contiguous with a top edge of said semispherical bowl means when said winged casing means is in said first position and a handle when said winged casing means is in said second position.

16. An animal litter container configured to hold a supply of a litter material, to provide an attractive location where an indoor pet can deposit waste, and to be easily cleaned and sanitized, comprising:

a. base means configured to provide a stable support and receptacle means formed in said base means;

b. container means sized and shaped to hold a supply of a litter material removably supported by said base means;

c. a pair of opposed wing element means rotatably mounted on said container means to move between a first position, wherein said wing element means substantially cover an exterior of said container means to conform to a configuration of said receptacle means and permit access to said litter supply by an animal, and a second position, wherein said wing element means extend above said container means to cover said litter supply and form a pod structure removable from said base means when said litter supply requires cleaning; and d. strainer means removably located in a bottom portion of said container means sized to separate soiled litter material from potentially reusable litter material.

17. The animal litter container of claim 16, wherein said container means includes axle means and said opposed wing element means include hinge means rotatably mountable and lockable on said axle means to rotate said wing element means between said first and second positions and to lock said wing element means in a selected position.

18. The animal litter container of claim 17, wherein each said wing element means further includes planar extension means configured to form integral handle means for lifting said pod structure when said wing element means are in said second position.

* * * * *